(12) United States Patent
Li et al.

(10) Patent No.: US 10,379,506 B2
(45) Date of Patent: Aug. 13, 2019

(54) SMART HOUSEHOLD EQUIPMENT CONTROLLING METHOD, APPARATUS AND NON-VOLATILE COMPUTER STORAGE MEDIUM

(71) Applicant: BEIJING BAIDU NETCOM SCIENCE AND TECHNOLOGY CO., LTD., Beijing (CN)

(72) Inventors: Guang Li, Beijing (CN); Tian Xia, Beijing (CN); Chang Huang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 147 days.

(21) Appl. No.: 15/537,389

(22) PCT Filed: Nov. 17, 2015

(86) PCT No.: PCT/CN2015/094768
§ 371 (c)(1),
(2) Date: Jun. 16, 2017

(87) PCT Pub. No.: WO2017/041360
PCT Pub. Date: Mar. 16, 2017

(65) Prior Publication Data
US 2018/0267487 A1 Sep. 20, 2018

(30) Foreign Application Priority Data
Sep. 9, 2015 (CN) .......................... 2015 1 0570541

(51) Int. Cl.
*G05B 15/02* (2006.01)
*G05B 19/418* (2006.01)
(Continued)

(52) U.S. Cl.
CPC ............ *G05B 15/02* (2013.01); *D06F 21/00* (2013.01); *D06F 33/02* (2013.01); *G05B 19/042* (2013.01);
(Continued)

(58) Field of Classification Search
None
See application file for complete search history.

(56) References Cited

U.S. PATENT DOCUMENTS

2003/0084047 A1* 5/2003 Williamson ........... G06Q 10/10
2010/0324962 A1* 12/2010 Nesler .................. G01R 21/133
705/7.36
(Continued)

FOREIGN PATENT DOCUMENTS

CN 101833286 A 9/2010
CN 102111314 A 6/2011
(Continued)

OTHER PUBLICATIONS

International Search Report for PCT/CN2015/094768, dated Jun. 3, 2016, and its English translation provided by WIPO.
(Continued)

*Primary Examiner* — Ramesh B Patel
(74) *Attorney, Agent, or Firm* — Ladas & Parry, LLP

(57) ABSTRACT

A smart household equipment controlling method and an apparatus are provided. Input information input by the user based on a natural dialog mode interface is obtained, then the control instruction of the smart household equipment is obtained according to the input information, so that the control instruction can be sent to the smart household equipment such that the smart household equipment executes an operation according to the control instruction.

15 Claims, 4 Drawing Sheets

(51) Int. Cl.
*H04M 11/00* (2006.01)
*G10L 15/08* (2006.01)
*G10L 15/22* (2006.01)
*G05B 19/042* (2006.01)
*D06F 21/00* (2006.01)
*D06F 33/02* (2006.01)
*D06F 39/00* (2006.01)

(52) U.S. Cl.
CPC ............ *G05B 19/418* (2013.01); *G10L 15/08* (2013.01); *G10L 15/22* (2013.01); *H04M 11/00* (2013.01); *H04M 11/007* (2013.01); *D06F 39/005* (2013.01); *D06F 2210/00* (2013.01); *D06F 2216/00* (2013.01); *G05B 2219/25168* (2013.01); *G05B 2219/2633* (2013.01); *G05B 2219/2642* (2013.01); *G10L 2015/223* (2013.01)

(56) References Cited

U.S. PATENT DOCUMENTS

| | | | | |
|---|---|---|---|---|
| 2013/0338839 | A1* | 12/2013 | Rogers | G05D 23/1904 700/278 |
| 2015/0067080 | A1 | 3/2015 | Cho et al. | |
| 2015/0312348 | A1* | 10/2015 | Lustgarten | H04L 67/12 705/14.66 |
| 2015/0350031 | A1* | 12/2015 | Burks | H04L 41/22 715/736 |
| 2016/0147499 | A1* | 5/2016 | Ryu | G06F 3/1454 715/748 |
| 2016/0195856 | A1* | 7/2016 | Spero | G06N 5/046 700/90 |
| 2016/0261932 | A1* | 9/2016 | Fadell | H04Q 9/00 |
| 2016/0313868 | A1* | 10/2016 | Weng | G06F 3/017 |
| 2017/0033944 | A1* | 2/2017 | Nadathur | H04L 12/2816 |

FOREIGN PATENT DOCUMENTS

| | | |
|---|---|---|
| CN | 102572104 A | 7/2012 |
| CN | 103135453 A | 6/2013 |
| CN | 103529778 A | 1/2014 |
| CN | 104597763 A | 5/2015 |
| CN | 104618780 A | 5/2015 |
| CN | 104808521 A | 7/2015 |
| CN | 104852957 A | 8/2015 |
| CN | 104885406 A | 9/2015 |
| DE | 102014108498 A1 | 12/2015 |
| KR | 20090020378 A | 2/2009 |

OTHER PUBLICATIONS

Written Opinion of the International Search Authority for PCT/CN2015/094768, dated Jun. 3, 2016, and its English translation provided by Bing.Com Microsoft Translate.

First Office Action and Search Report from CN app. No. 201510570541.2, dated Jun. 20, 2017, with English translation from Global Dossier.

Second Office Action and Supplementary Search Report from CN app. No. 201510570541.2, dated Feb. 12, 2018, with English translation from Global Dossier.

Third Office Action from CN app. No. 201510570541.2, dated Jul. 3, 2018, with English translation from Global Dossier.

"Smartphone voice assistant based on interaction efficiency", Hunan University Master's Thesis, May 29, 2015, with machine English translation from Google Translate.

Written Opinion of the International Searching Authority from PCT/CN2015/094768, dated Jun. 3, 2016, with English translation provided by WIPO.

International Preliminary Report on Patentability from PCT/CN2015/094768, dated Mar. 13, 2018, with English translation provided by WIPO.

* cited by examiner

SMART HOUSEHOLD EQUIPMENT CONTROLLING METHOD, APPARATUS AND NON-VOLATILE COMPUTER STORAGE MEDIUM

The present application is the U.S. national phase of PCT Application PCT/CN2015/094768 filed on Nov. 17, 2015, which claims priority to the Chinese patent application No. 201510570541.2 entitled "Smart Household Equipment Controlling Method and Apparatus" filed on Sep. 9, 2015, the disclosures of which are hereby incorporated by reference in their entireties

FIELD OF THE DISCLOSURE

The present disclosure relates to Internet technologies, and particularly to a smart household equipment controlling method and apparatus, an apparatus and a non-volatile computer storage medium.

BACKGROUND OF THE DISCLOSURE

As informatization of household equipment quickens, more and more equipment become smart. For example, smart household equipment such as smart refrigerators, smart washing machines and smart TV sets have already become available in the market. Currently, the smart household equipment may mainly be controlled remotely through operable controls provided by applications installed on a terminal such as a mobile phone, a computers or the like. However, since a display area of a terminal is limited, it might be impossible to display, on a first screen of the terminal, all operable controls of smart household equipment provided by the application so that the user needs to browse each screen of the terminal again and again to find an application-provided operable control that the user desires to use. As such, this increases data interaction between the application and a processing engine used by the application and thereby causes increase of the processing burden of the processing engine.

SUMMARY OF THE DISCLOSURE

A plurality of aspects of the present disclosure provide a smart household equipment controlling method and apparatus, an apparatus and a non-volatile computer storage medium, to reduce the processing burden of the processing engine.

According to an aspect of the present disclosure, there is provided a smart household equipment controlling method, comprising:

obtaining input information input by a user based on a natural dialog mode interface;

obtaining a control instruction of the smart household equipment according to the input information;

sending the control instruction to the smart household equipment so that the smart household equipment executes an operation according to the control instruction.

The above aspect and any possible implementation mode further provide an implementation mode: the input information comprises at least one of the following data:
text data;
image data;
audio data;
video data;
gesture data; and
control data.

The above aspect and any possible implementation mode further provide an implementation mode: the natural dialog mode interface comprises a dialog box display area and a function option display area.

The above aspect and any possible implementation mode further provide an implementation mode: the obtaining input information input by the user based on the natural dialog mode interface comprises:

outputting an operable control in the dialog box display area for the user to operate;

obtaining the input information input by the user upon operating the operable control.

The above aspect and any possible implementation mode further provide an implementation mode: after sending the control instruction to the smart household equipment so that the smart household equipment executes an operation according to the control instruction, the method further comprises:

receiving operation state information sent by the smart household equipment according to operation-executing situations of the smart household equipment;

outputting the operation state information.

The above aspect and any possible implementation mode further provide an implementation mode: the operation state information comprises at least one of the following data:
text data;
image data;
audio data; and
video data.

According to another aspect of the present disclosure, there is provided a smart household equipment controlling apparatus, comprising:

an obtaining unit configured to obtain input information input by a user based on a natural dialog mode interface;

a controlling unit configured to obtain a control instruction of the smart household equipment according to the input information;

a sending unit configured to send the control instruction to the smart household equipment so that the smart household equipment executes an operation according to the control instruction.

The above aspect and any possible implementation mode further provide an implementation mode: the input information comprises at least one of the following data:
text data;
image data;
audio data;
video data;
gesture data; and
control data.

The above aspect and any possible implementation mode further provide an implementation mode: the natural dialog mode interface comprises a dialog box display area and a function option display area.

The above aspect and any possible implementation mode further provide an implementation mode: the obtaining unit is specifically configured to output the operable control in the dialog box display area for the user to operate, and obtain the input information input by the user upon operating the operable control.

The above aspect and any possible implementation mode further provide an implementation mode: the smart household equipment controlling apparatus further comprises an outputting unit configured to receive operation state information sent by the smart household equipment according to operation-executing situations of the smart household equipment; and output the operation state information.

The above aspect and any possible implementation mode further provide an implementation mode: the operation state information comprises at least one of the following data:

text data;

image data;

audio data; and video data.

According to a further aspect of the present disclosure, there is provided an apparatus, comprising one or more processors;

a memory;

one or more programs stored in the memory and configured to execute the following operations when executed by the one or more processors:

obtaining input information input by a user based on a natural dialog mode interface;

obtaining a control instruction of the smart household equipment according to the input information;

sending the control instruction to the smart household equipment so that the smart household equipment executes an operation according to the control instruction.

According to a further aspect of the present disclosure, there is provided a non-volatile computer storage medium in which one or more programs are stored, an apparatus being enabled to execute the following operations when said one or more programs are executed by the apparatus:

obtaining input information input by a user based on a natural dialog mode interface;

obtaining a control instruction of the smart household equipment according to the input information;

sending the control instruction to the smart household equipment so that the smart household equipment executes an operation according to the control instruction.

As known from the above technical solution, input information input by the user based on a natural dialog mode interface is obtained, then the control instruction of the smart household equipment is obtained according to the input information, so that the control instruction can be sent to the smart household equipment such that the smart household equipment executes an operation according to the control instruction. Since the natural dialog mode interface is used as an interaction mode with the user, it is unnecessary to display all operable controls of the smart household equipment provided by the application on the screen of the terminal. Therefore, this can avoid the problem in the prior art about increase of data interaction between the application and the processing engine used by the application due to a limited display area of the terminal, and thereby reduce the processing burden of the processing engine.

In addition, by employing the natural dialog mode interface as the interaction mode with the user, and enabling input of data such as text data, image data, audio data, video data, gesture data, control data and the like, the technical solution according to the present disclosure is employed, provides an interface control scheme interacting with multimedia content, and can effectively improve the control efficiency of the smart household equipment.

In addition, according to the technical solution provided by the present disclosure, since the natural dialog mode interface is used as the interaction mode with the user, it is feasible to output, in the dialog box display area of the natural dialog mode interface, partial operable controls needed by the user, and it is unnecessary to display on the screen of the terminal all operable controls of the smart household equipment provided by the application, so that the user can conveniently and quickly find an operable control to be used. Therefore, the control efficiency of the smart household equipment can be improved more efficiently.

In addition, the user experience can be boosted substantially by using the technical solutions according to the present disclosure.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "I" in the text generally indicates associated objects before and after the symbol are in an "or" relationship.

Figure 1:
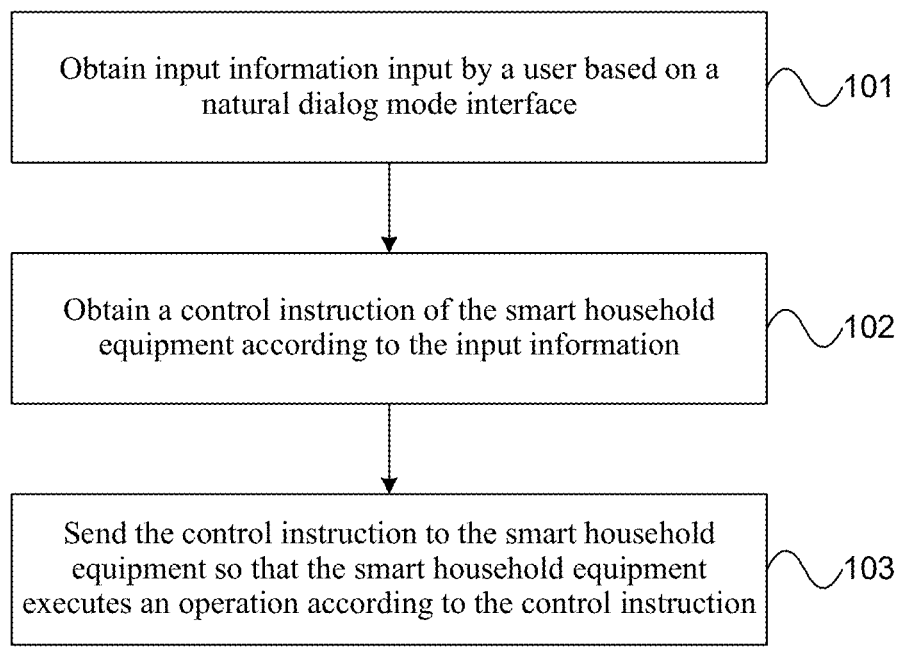
FIG. 1 is a flow chart of a smart household equipment controlling method according to an embodiment of the present disclosure.

FIG. 1 is a flow chart of a smart household equipment controlling method according to an embodiment of the present disclosure.

101: obtaining input information input by a user based on a natural dialog mode interface.

102: obtaining a control instruction of the smart household equipment according to the input information.

103: sending the control instruction to the smart household equipment so that the smart household equipment executes an operation according to the control instruction.

It needs to be appreciated that a subject for executing 101-103 may be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

As such, input information input by a user based on a natural dialog mode interface is obtained, then a control instruction of the smart household equipment is obtained according to the input information, so that the control instruction can be sent to the smart household equipment such that the smart household equipment performs an operation according to the control instruction. Since the natural dialog mode interface is used as an interaction mode with the user, it is unnecessary to display all operable controls of the smart household equipment provided by the application on the screen of the terminal. Therefore, this can avoid the problem in the prior art about increase of data interaction between the application and the processing engine used by the application due to a limited display area of the terminal, and thereby reduce the processing burden of the processing engine.

Optionally, in a possible implementation mode of the present embodiment, in 101, obtaining the input information may include but is not limited to at least one of the following data:

text data;
image data;
audio data;
video data;
gesture data; and
control data.

The present disclosure provides a complete user input manner, enables users in different groups to flexibly select his own most habitual input manner in his own specific scenario, and improves the user's input efficiency.

The present disclosure provides an interface control scheme interacting with multimedia content, may support input of multimedia data such as text data, image data, audio data, video data, gesture data, control data and the like, and can effectively improve the control efficiency of the smart household equipment.

Figure 2A:
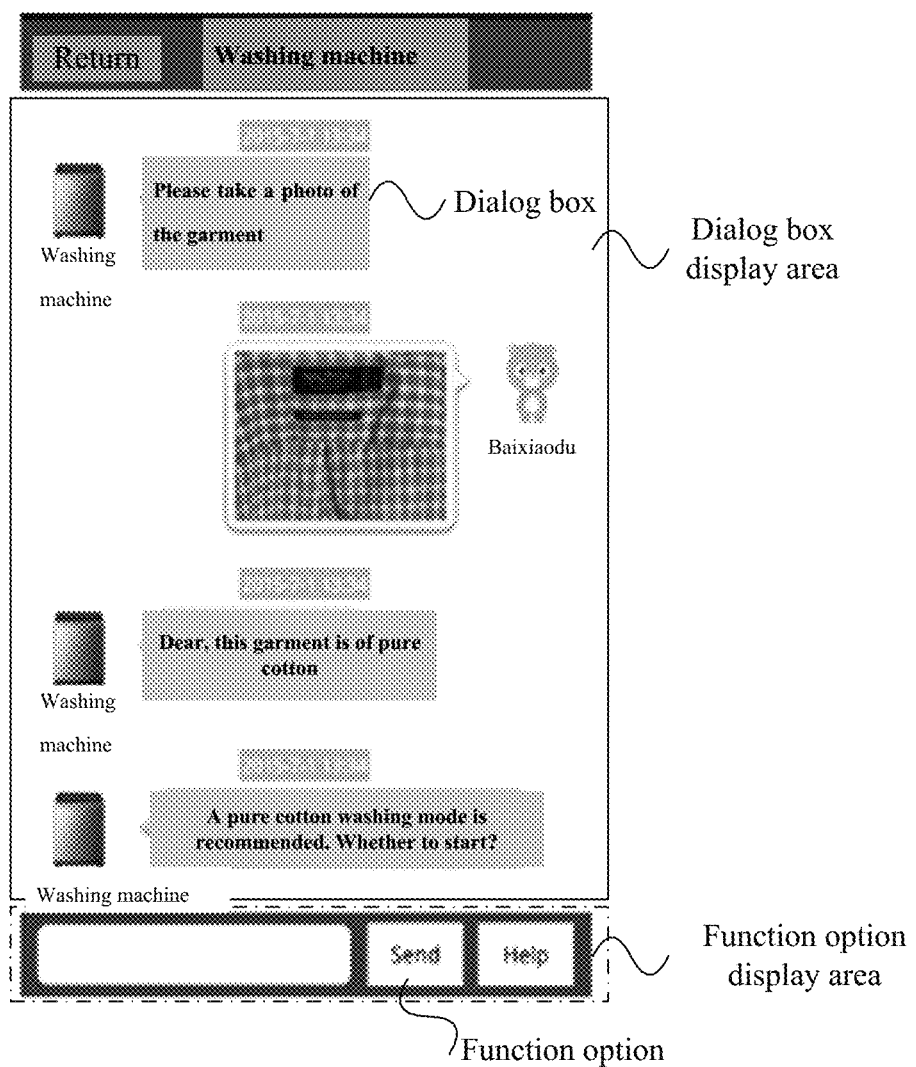
FIG. 2A is a schematic view of a natural dialog mode interface in the embodiment corresponding to FIG. 1.

Optionally, in a possible implementation mode of the present embodiment, in 101, the employed natural dialog mode interface may include but not limited to a dialog box display area and a function option display area as shown in FIG. 2A. This is not particularly limited in the present embodiment.

The dialog display area refers to an area for displaying information content of interaction with the user, for example, the user-input input information, information fed back by the application according to the input information, and the like.

The function option display area refers to an area for displaying some function options, for example, function options such as text input, image input, speech input, video input, gesture input and control input.

The user may select a function option that most fits himself from the function options displayed by the function option display area:

If the user selects the function option of the text input, for example, keyboard input function option or handwriting input function option, the user may use an input device such as a keyboard or touch screen to input the input information.

If the user selects the function option of image input or video input, for example, the function option of selecting a photo from an album or the function option of taking a photo via the camera, the user may use an input device such as a keyboard, a touch screen or an image collecting device to input the input information, as shown in FIG. 2A.

If the user selects the function option of speech input, the user may use an input device such as a microphone to input the input information.

If the user selects the function option of gesture input, the user may use an input device such as a touch screen to input the input information.

If the user selects the function option of control input, the user may use the provided operable controls to input the input information.

During specific implementation, many manners may be specifically employed to provide the operable controls to the user.

In a specific implementation procedure, it is feasible to specifically provide some simple operable controls in the function option display area such as a helping control or a sending control for the user to operate. In this way may be obtained the input information input by the user upon operating the operable control.

Figure 2B:
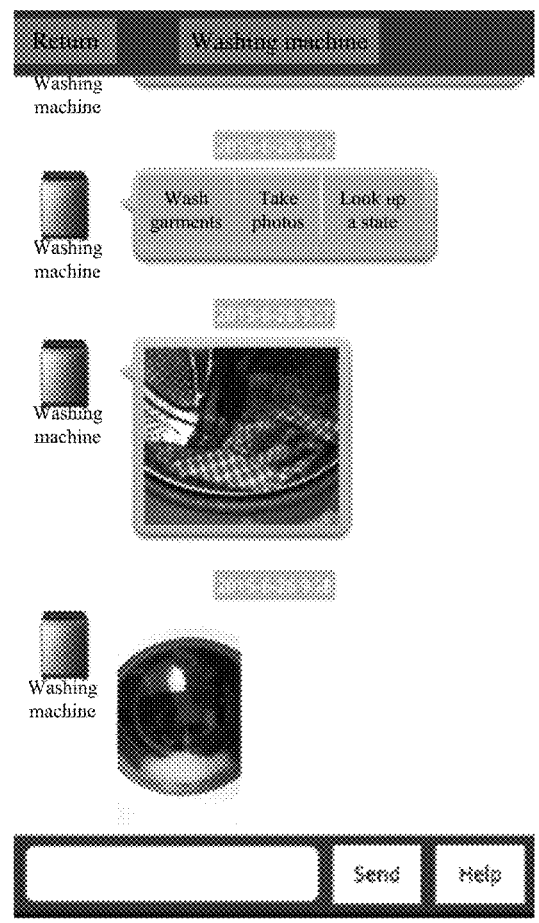
FIG. 2B is another schematic view of a natural dialog mode interface in the embodiment corresponding to FIG. 1.

In another specific implementation procedure, it is feasible to specifically output the operable control such as a clothes-washing control, a photo-taking control or a state lookup control in the dialog box display area for the user to operate, as shown in FIG. 2B. In this way may be obtained the input information input by the user upon operating the operable control. Different from a conventional information feedback mechanism, the present disclosure innovatively proposes that an operable button serves as a feedback so that the user can directly and quickly and efficiently complete the operation.

During implementation, it is unnecessary to display on the screen of the terminal all operable controls of the smart household equipment provided by the application, so that the user can conveniently and quickly find an operable control to be used. Therefore, the control efficiency of the smart household equipment can be improved more efficiently.

Optionally, in a possible implementation mode of the present embodiment, after 103, it is further feasible to receive operation state information sent by the smart household equipment according to operation-executing situations of the smart household equipment, and then output the operation state information.

In a specific implementation procedure, the smart household equipment may initiatively send the operation state information according to the operation-executing situations of the smart household equipment.

In another specific implementation procedure, it is feasible to obtain the input information input by the user based on the natural dialog mode interface, for example, how about the clothes being washed, and then return the operation state information according to the obtained input information.

Specifically, the operation state information may be output in the natural dialog mode interface.

The operation state information may include but not limited to at least one of the following data:
text data;
image data;
audio data; and
video data.

As such, rich information feedback manners are provided, and the most visual manner may be smartly employed for display according to the content of the information. For example, the operation state of the current smart household equipment may be looked up in an image or video manner.

In the present disclosure, the terminal provides high-quality services to the user in the form of a user smart assistant. The operated interface is displayed according to the natural dialog mode interface.

The user smart assistant embodies various smart recognition technologies. As for a user input phase, the user smart assistant supports text recognition, gesture recognition, speech recognition and understanding, and image and video recognition, can obtain the user's various input and thereby capture an operation command for the user's operation and an operation intention of the user's operation. As for a user output phase, the user smart assistant flexibly proposes the most appropriate multimedia feedback forms according to the feedback types. Even the operable control that may be directly operated by the user is directly fed back to the user to enable the user to directly complete the desired task.

As compared with the technical solution provided in the prior art, in the technical solution according to the present disclosure, the interaction interface between the terminal and the user can highlight intelligentization of the interaction and enable the machine to understand the user more. The natural dialog mode interface employed by the present disclosure can cater for more user groups and corresponding operation habits, enrich the interface feedback manners and thereby provide a more convenient, quicker and efficient operation manner.

In the present disclosure, the interaction with the user employs the natural dialog mode, i.e., all operations and feedback content are displayed on the interface displayed by the terminal in an information-recording manner in a form of a time axis. Advantages of such interaction mode are as follows:
conforming to operation habits of different user groups;
providing complete operation manners to the user and helping him to flexibly complete efficient input; and
providing rich and vivid multimedia content feedback manners and allowing the user to visually understand the operation-executing situations of the smart household equipment.

In addition, interaction with the user using the natural dialog mode interface enables all operation records of the user to be retained so that the user can very conveniently look up historical operations.

In the present embodiment, input information input by the user based on a natural dialog mode interface is obtained, then the control instruction of the smart household equipment is obtained according to the input information, so that the control instruction can be sent to the smart household equipment such that the smart household equipment executes an operation according to the control instruction. Since the natural dialog mode interface is used as an interaction mode with the user, it is unnecessary to display all operable controls of the smart household equipment provided by the application on the screen of the terminal. Therefore, this can avoid the problem in the prior art about increase of data interaction between the application and the processing engine used by the application due to a limited display area of the terminal, and thereby reduce the processing burden of the processing engine.

In addition, by employing the natural dialog mode interface as the interaction mode with the user, and enabling input of data such as text data, image data, audio data, video data, gesture data, control data and the like, the technical solution according to the present disclosure is employed, provides an interface control scheme interacting with multimedia content, and can effectively improve the control efficiency of the smart household equipment.

In addition, according to the technical solution provided by the present disclosure, since the natural dialog mode interface is used as the interaction mode with the user, it is feasible to output, in the dialog box display area of the natural dialog mode interface, partial operable controls needed by the user, and it is unnecessary to display on the screen of the terminal all operable controls of the smart household equipment provided by the application, so that the user can conveniently and quickly find an operable control to be used. Therefore, the control efficiency of the smart household equipment can be improved more efficiently.

In addition, the user experience can be boosted substantially by using the technical solution according to the present disclosure.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 3:
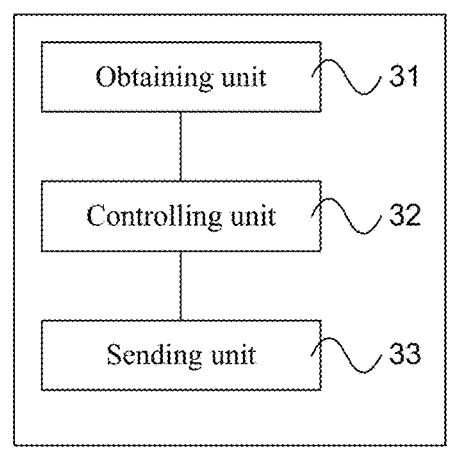
FIG. 3 is a structural schematic view of a smart household equipment controlling apparatus according to another embodiment of the present disclosure.

FIG. 3 is a structural schematic view of a smart household equipment controlling apparatus according to another embodiment of the present disclosure. As shown in FIG. 3, the smart household equipment controlling apparatus according to the present embodiment may comprise an obtaining unit 31, a controlling unit 32 and a sending unit 33, wherein the obtaining unit 31 is configured to obtain input information input by a user based on a natural dialog mode interface; the controlling unit 32 is configured to obtain a control instruction of the smart household equipment according to the input information; and the sending unit 33 is configured to send the control instruction to the smart household equipment so that the smart household equipment executes an operation according to the control instruction.

It needs to be appreciated that part or all of the smart household equipment controlling apparatus according to another embodiment may be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

Optionally, in a possible implementation mode of the present embodiment, the input information obtained by the obtaining unit 31 may include but is not limited to at least one of the following data:

text data;
image data;
audio data;
video data;
gesture data; and
control data.

The present disclosure provides a complete user input manner, enables users in different groups to flexibly select his own most habitual input manner in his own specific scenario, and improves the user's input efficiency.

The present disclosure may support input of data such as text data, image data, audio data, video data, gesture data, control data and the like, provides an interface control scheme interacting with multimedia content, and can effectively improve the control efficiency of the smart household equipment.

Optionally, in a possible implementation mode of the present embodiment, the employed natural dialog mode interface may include but not limited to a dialog box display area and a function option display area. This is not particularly limited in the present embodiment.

Optionally, in a possible implementation mode of the present embodiment, the obtaining unit 31 is specifically configured to output the operable control in the dialog box display area for the user to operate, and obtain the input information input by the user upon operating the operable control.

Figure 4:
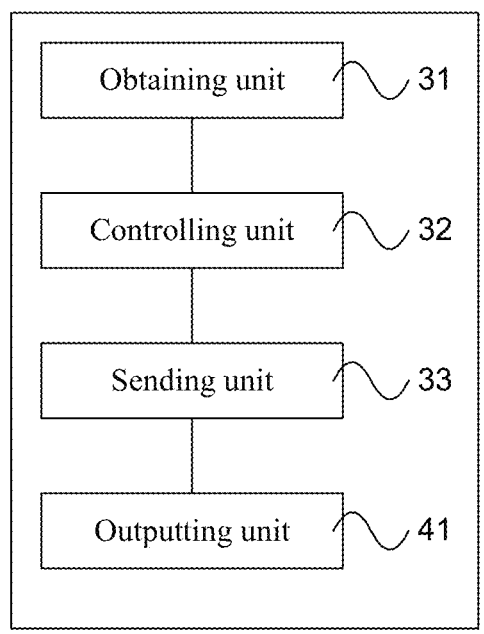
FIG. 4 is a structural schematic view of a smart household equipment controlling apparatus according to another embodiment of the present disclosure

Optionally, in a possible implementation mode of the present embodiment, as shown in FIG. 4, the smart household equipment controlling apparatus according to the present embodiment may further comprise an outputting unit 41 configured to receive operation state information sent by the smart household equipment according to operation-executing situations of the smart household equipment, and then output the operation state information.

The operation state information may include but is not limited to at least one of the following data:

text data;
image data;
audio data; and
video data.

As such, rich information feedback manners are provided, and the most visual manner may be smartly employed for display according to the content of the information. For example, the operation state of the current smart household equipment may be looked up in an image or video manner.

It needs to be appreciated that the method in the embodiment corresponding to FIG. 1 may be implemented by the smart household equipment controlling apparatus according to the present embodiment. Reference may be made to relevant resources in the embodiment corresponding to FIG. 1 for detailed description, which will not be detailed any longer here.

In the present embodiment, input information input by the user based on a natural dialog mode interface is obtained, then the control instruction of the smart household equipment is obtained according to the input information, so that the control instruction can be sent to the smart household equipment such that the smart household equipment executes an operation according to the control instruction. Since the natural dialog mode interface is used as an interaction mode with the user, it is unnecessary to display all operable controls of the smart household equipment provided by the application on the screen of the terminal. Therefore, this can avoid the problem in the prior art about increase of data interaction between the application and the processing engine used by the application due to a limited display area of the terminal, and thereby reduce the processing burden of the processing engine.

In addition, by employing the natural dialog mode interface as the interaction mode with the user, and enabling input of data such as text data, image data, audio data, video data, gesture data, control data and the like, the technical solution according to the present disclosure is employed, provides an interface control scheme interacting with multimedia content, and can effectively improve the control efficiency of the smart household equipment.

In addition, according to the technical solution provided by the present disclosure, since the natural dialog mode interface is used as the interaction mode with the user, it is feasible to output, in the dialog box display area of the natural dialog mode interface, partial operable controls needed by the user, and it is unnecessary to display on the screen of the terminal all operable controls of the smart household equipment provided by the application, so that the user can conveniently and quickly find an operable control to be used. Therefore, the control efficiency of the smart household equipment can be improved more efficiently.

In addition, the user experience can be boosted substantially by using the technical solution according to the present disclosure.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A smart household equipment controlling method, wherein the method comprises:
    obtaining input information input by a user based on a natural dialog mode interface to provide an interaction mode with the user, wherein the natural dialog mode interface is configured to enable input including text data, image data, audio data, video data, gesture data, and control data via a unified interface;
    obtaining a control instruction of the smart household equipment according to the input information;
    sending the control instruction to the smart household equipment so that the smart household equipment executes an operation according to the control instruction.

2. The method according to claim 1, wherein the natural dialog mode interface comprises a dialog box display area and a function option display area.

3. The method according to claim 2, wherein the obtaining input information input by the user based on the natural dialog mode interface comprises:
    outputting an operable control in the dialog box display area for the user to operate;
    obtaining the input information input by the user upon operating the operable control.

4. The method according to claim 1, further comprises:
    receiving operation state information sent by the smart household equipment according to operation-executing situations of the smart household equipment;
    outputting the operation state information.

5. The method according to claim 4, wherein the operation state information comprises at least one of the following data:
    text data;
    image data;
    audio data; and
    video data.

6. An apparatus, comprising
    one or more processors;
    a memory;
    one or more programs stored in the memory and configured to execute the following operations when executed by the one or more processors:
        obtaining input information input by a user based on a natural dialog mode interface to provide an interaction mode with the user, wherein the natural dialog mode interface is configured to enable input including text data, image data, audio data, video data, gesture data, and control data via a unified interface;
        obtaining a control instruction of the smart household equipment according to the input information;
        sending the control instruction to the smart household equipment so that the smart household equipment executes an operation according to the control instruction.

7. The apparatus according to claim 6, wherein the natural dialog mode interface comprises a dialog box display area and a function option display area.

8. The apparatus according to claim 6, wherein the operation of obtaining input information input by the user based on the natural dialog mode interface comprises:
    outputting an operable control in the dialog box display area for the user to operate;
    obtaining the input information input by the user upon operating the operable control.

9. The apparatus according to claim 6, wherein after sending the control instruction to the smart household equipment so that the smart household equipment executes an operation according to the control instruction, the operation further comprises:
    receiving operation state information sent by the smart household equipment according to operation-executing situations of the smart household equipment;
    outputting the operation state information.

10. The apparatus according to claim 9, wherein the operation state information comprises at least one of the following data:
    text data;
    image data;
    audio data; and
    video data.

11. A non-volatile computer storage medium in which one or more programs are stored, an apparatus being enabled to execute the following operation when said one or more programs are executed by the apparatus:
    obtaining input information input by a user based on a natural dialog mode interface to provide an interaction mode with the user, wherein the natural dialog mode interface is configured to enable input including text data, image data, audio data, video data, gesture data, and control data via a unified interface;
    obtaining a control instruction of the smart household equipment according to the input information;
    sending the control instruction to the smart household equipment so that the smart household equipment executes an operation according to the control instruction.

12. The non-volatile computer storage medium according to claim 11, wherein the natural dialog mode interface comprises a dialog box display area and a function option display area.

13. The non-volatile computer storage medium according to claim 11, wherein the operation of obtaining input information input by the user based on the natural dialog mode interface comprises:
    outputting an operable control in the dialog box display area for the user to operate;
    obtaining the input information input by the user upon operating the operable control.

14. The non-volatile computer storage medium according to claim 11, wherein after sending the control instruction to the smart household equipment so that the smart household equipment executes an operation according to the control instruction, the operation further comprises:

receiving operation state information sent by the smart household equipment according to operation-executing situations of the smart household equipment;

outputting the operation state information.

15. The non-volatile computer storage medium according to claim 14, wherein the operation state information comprises at least one of the following data:

text data;
image data;
audio data; and
video data.

* * * * *